US 6,459,443 B1

(12) United States Patent
Klement et al.

(10) Patent No.: US 6,459,443 B1
(45) Date of Patent: Oct. 1, 2002

(54) METHOD OF MINIMIZING PRINT DELAY DUE TO MIRROR MOTOR WARM-UP IN AN ELECTROPHOTOGRAPHIC MACHINE

(75) Inventors: Martin Christopher Klement; John Parker Richey, both of Lexington, KY (US)

(73) Assignee: Lexmark International, Inc, Lexington, KY (US)

( * ) Notice: Subject to any disclaimer, the term of this patent is extended or adjusted under 35 U.S.C. 154(b) by 0 days.

(21) Appl. No.: 09/886,139

(22) Filed: Jun. 21, 2001

(51) Int. Cl.[7] .......................... B41J 2/385; B41J 27/00; G03G 13/04

(52) U.S. Cl. ....................................... 347/129; 347/261

(58) Field of Search ................................. 347/134, 241, 347/243, 256, 261, 129

(56) References Cited

U.S. PATENT DOCUMENTS

| | | | |
|---|---|---|---|
| 4,647,946 A | * | 3/1987 | Inuyama |
| 4,763,241 A | | 8/1988 | Egawa et al. |
| 4,775,945 A | | 10/1988 | Cavill et al. |
| 4,777,609 A | | 10/1988 | Cavill et al. |
| 4,816,924 A | | 3/1989 | Sekiya |
| 4,819,019 A | | 4/1989 | Egawa et al. |
| 4,862,288 A | | 8/1989 | Sekiya |
| 4,876,560 A | | 10/1989 | Egawa et al. |
| 4,885,596 A | | 12/1989 | Egawa et al. |
| 4,893,136 A | | 1/1990 | Curry |
| 4,975,626 A | | 12/1990 | Yagi et al. |
| 4,998,216 A | | 3/1991 | Hino et al. |
| 5,144,339 A | * | 9/1992 | Ohashi et al. |
| 5,153,745 A | | 10/1992 | Brandkamp et al. |
| 5,207,520 A | | 5/1993 | Tanaka |
| 5,274,461 A | | 12/1993 | Mitsuhashi |
| 5,347,298 A | | 9/1994 | Gokita |
| 5,374,947 A | | 12/1994 | Takahashi et al. |
| 5,416,504 A | | 5/1995 | Ohashi |
| 5,445,017 A | | 8/1995 | Mizuno |
| 5,448,267 A | | 9/1995 | Sugiura et al. |
| 5,450,118 A | | 9/1995 | Sawada et al. |
| 5,457,766 A | | 10/1995 | Ko |
| 5,488,225 A | | 1/1996 | Hiramatsu |
| 5,504,517 A | | 4/1996 | Takashi et al. |
| 5,527,121 A | | 6/1996 | Santon |
| 5,528,346 A | | 6/1996 | Kim et al. |
| 5,550,573 A | | 8/1996 | Serizawa et al. |
| 5,576,536 A | | 11/1996 | Hiramatsu et al. |
| 5,589,923 A | | 12/1996 | Lee et al. |
| 5,627,947 A | | 5/1997 | Chan et al. |
| 5,677,724 A | | 10/1997 | Takizawa et al. |
| 5,703,455 A | | 12/1997 | Miyazaki |
| 5,754,215 A | | 5/1998 | Kataoka et al. |
| 5,790,164 A | | 8/1998 | Kamo |
| 5,801,740 A | | 9/1998 | Isono et al. |
| 5,808,431 A | | 9/1998 | Koyama et al. |
| 5,809,369 A | | 9/1998 | Furuya et al. |
| 5,821,977 A | * | 10/1998 | Nishimura |
| 5,864,355 A | | 1/1999 | Bush et al. |
| 5,877,798 A | | 3/1999 | Clarke et al. |
| 5,883,659 A | | 3/1999 | Serizawa et al. |
| 5,930,551 A | | 7/1999 | Nakazato et al. |
| 5,933,266 A | | 8/1999 | Minakuchi |

(List continued on next page.)

Primary Examiner—Susan S. Y. Lee
(74) Attorney, Agent, or Firm—Taylor & Aust, P.C.

(57) ABSTRACT

A method of activating an electrophotographic machine includes determining at least one condition of the electrophotographic machine. Power is applied to a polygon mirror. A time period required for the polygon mirror to accelerate from a stationary condition to a target rotational velocity is measured. The measured time period and data associated with the at least one condition are stored in a memory device. The polygon mirror is decelerated back to the stationary condition. Power is reapplied to the polygon mirror at a point in time. The measured time period and the data are used to determine when to begin at least one process in the electrophotographic machine relative to the point in time.

22 Claims, 3 Drawing Sheets

U.S. PATENT DOCUMENTS

| | | |
|---|---|---|
| 5,943,087 A | 8/1999 | Kataoka et al. |
| 6,031,562 A * | 2/2000 | Yamanaka ................. 347/261 |
| 6,055,010 A | 4/2000 | Rockwell et al. |
| 6,064,419 A | 5/2000 | Uchiyama |
| 6,100,998 A | 8/2000 | Nagao et al. |
| 6,104,519 A | 8/2000 | Shiraishi et al. |

* cited by examiner

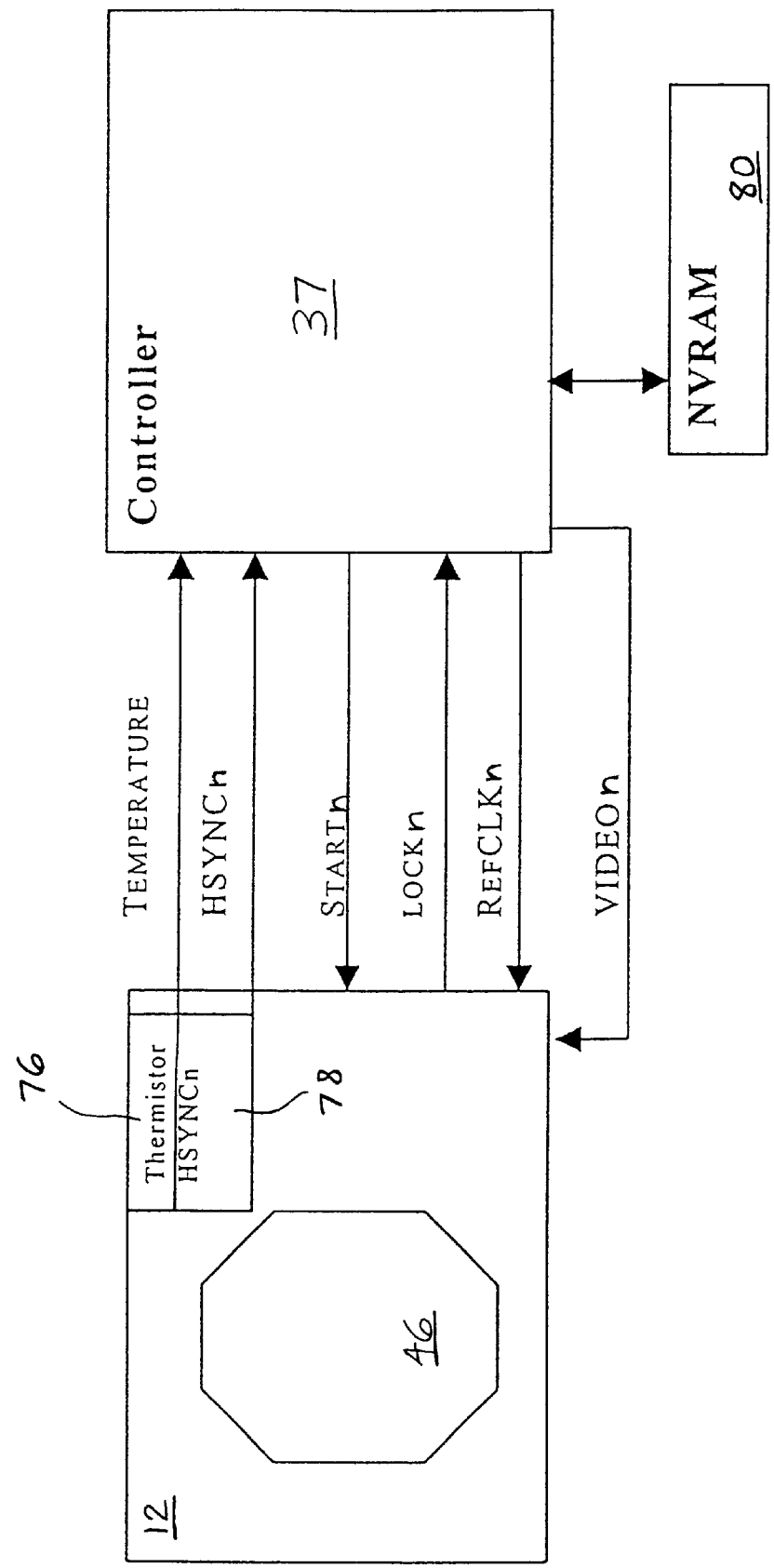

METHOD OF MINIMIZING PRINT DELAY DUE TO MIRROR MOTOR WARM-UP IN AN ELECTROPHOTOGRAPHIC MACHINE

BACKGROUND OF THE INVENTION

1. Field of the Invention

The present invention relates to an electrophotographic machine, and, more particularly, to a method of minimizing a delay in printing a first page in an electrophotographic machine.

2. Description of the Related Art

On laser printers and copiers with a rotating mirror and laser, time to first page can be of critical importance. A laser printer typically has a polygon mirror that, during printing, rotates at a constant angular velocity. Time to first page is a function of paper path length, image/media velocity and warm-up time of the polygon mirror. Typically, warm-up time involves waiting until the mirror is rotating at a specified velocity. Prior to printing, the polygon mirror accelerates from 0 rpm to some terminal rate of angular velocity.

In order to minimize time to first page, some processes that cannot be completed before the polygon mirror has achieved constant speed must nevertheless be started before the polygon mirror has achieved constant speed. Such concurrent processes may include bias voltage stabilization, performing an erase cycle on a photoconductive drum, and performing a paper pick operation. Traditionally, before the processes are commenced, the angular velocity of the mirror increases rapidly and then a long delay time is allowed in order to guarantee that the velocity is exactly equal to the desired rate before the concurrent processes are complete. Imaging on the photoconductor cannot begin until the angular velocity exactly matches the terminal rate. This typically affects the "time to first page", i.e., the time the user must wait to get the first printed page output from the printer.

What is needed in the art is a method of minimizing the delay in time to first page associated with mirror motor warm-up time.

SUMMARY OF THE INVENTION

The present invention provides a method of predicting an amount of time needed for polygon mirror warm-up.

The invention comprises, in one form thereof, a method of activating an electrophotographic machine. At least one condition of the electrophotographic machine is determined. Power is applied to a polygon mirror. A time period required for the polygon mirror to accelerate from a stationary condition to a target rotational velocity is measured. The measured time period and data associated with the at least one condition are stored in a memory device. The polygon mirror is decelerated back to the stationary condition. Power is reapplied to the polygon mirror at a point in time. The measured time period and the data are used to determine when to begin at least one process in the electrophotographic machine relative to the point in time.

An advantage of the present invention is that the delay in time to first page associated with mirror motor warm-up is minimized.

Another advantage is that, with the reduced delay in time to first page, there is less wear on the printhead since the total time that the polygon mirror is rotating is reduced.

Yet another advantage is that adequate controls are provided to guarantee that printing does not begin too early, which could cause print defects.

A further advantage is that there is very little cost associated with implementing the present invention.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is a schematic view of the controller and one of the printheads of FIG. 1.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
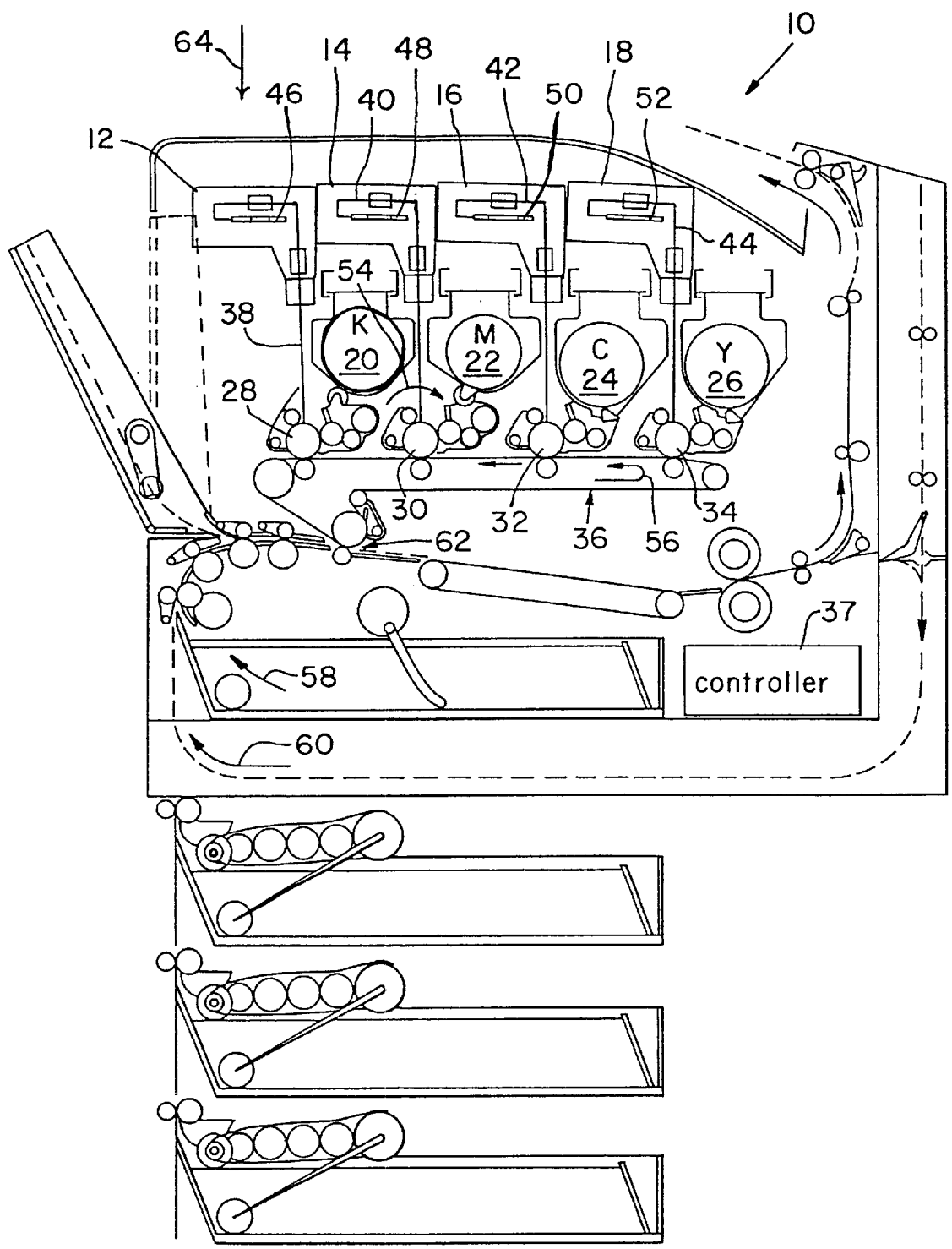
FIG. 1 is a side sectional view of a multicolor laser printer which can be used in conjunction with the method of the present invention.

Referring now to the drawings and, more particularly, to FIG. 1, there is shown one embodiment of a multicolor laser printer 10 including laser print heads 12, 14, 16, 18, a black toner cartridge 20, a magenta toner cartridge 22, a cyan toner cartridge 24, a yellow toner cartridge 26, photoconductive drums 28, 30, 32, 34, an intermediate transfer member belt 36 and a controller 37. The controller is a combination of Application Specific Integrated Circuits (ASIC's), microprocessors, and firmware suited to the tasks described.

Each of laser print heads 12, 14, 16 and 18 projects a respective laser beam 38, 40, 42, 44 off of a respective one of polygon mirrors 46, 48, 50 and 52. As each of polygon mirrors 46, 48, 50 and 52 rotates, it scans a respective one of reflected laser beams 38, 40, 42 and 44 in a scan direction, perpendicular to the plane of FIG. 1, across a respective one of photoconductive drums 28, 30, 32 and 34. Each of photoconductive drums 28, 30, 32 and 34 is negatively charged to approximately −1000 volts and is subsequently discharged to a level of approximately −300 volts in the areas of its peripheral surface that are impinged by a respective one of laser beams 38, 40, 42 and 44. During each scan of a laser beam across a photoconductive drum, each of photoconductive drums 28, 30, 32 and 34 is continuously rotated, clockwise in the embodiment shown, in a process direction indicated by direction arrow 54. The scanning of laser beams 38, 40, 42 and 44 across the peripheral surfaces of the photoconductive drums is cyclically repeated, thereby discharging the areas of the peripheral surfaces on which the laser beams impinge.

The toner in each of toner cartridges 20, 22, 24 and 26 is negatively charged and is transported upon the surface of a developer roll biased to approximately −600 volts. Thus, when the toner from cartridges 20, 22, 24 and 26 is brought into contact with a respective one of photoconductive drums 28, 30, 32 and 34, the toner is attracted to and adheres to the portions of the peripheral surfaces of the drums that have been discharged to −300 volts by the laser beams. As belt 36 rotates in the direction indicated by arrow 56, the toner from each of drums 28, 30, 32 and 34 is transferred to the outside surface of belt 36. As a print medium, such as paper, travels along either path 58 or duplexing path 60, the toner is transferred to the surface of the print medium in nip 62.

Figure 2:
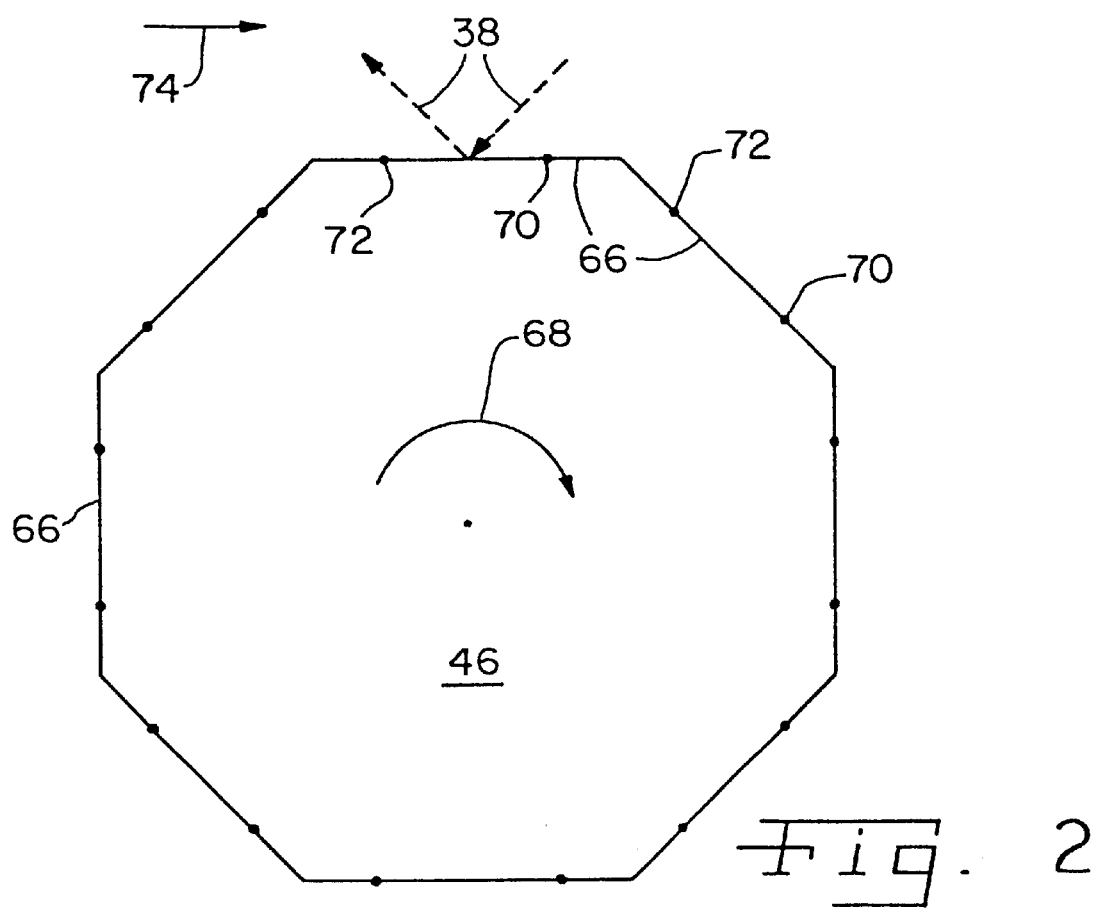
FIG. 2 is a cross-sectional view of one of the polygon mirrors of FIG. 1 reflecting a laser beam.

One embodiment of a polygon mirror 46 is shown in FIG. 2 as viewed in the direction of arrow 64 in FIG. 1. Polygon mirror 46 is shaped as an octagon with eight reflective sides or facets 66. As polygon mirror 46 rotates in the direction indicated by arrow 68, laser beam 38 reflects off of facets 66 between points 70 and 72 toward photoconductive drum 28. Thus, as polygon mirror 46 rotates in direction 68, the reflected laser beam 38 is caused to scan across the peripheral surface of photoconductive drum 28 in scan direction 74.

Printhead temperature, age and voltage are among the factors that affect the time required for the mirror motor to reach constant speed. Printer 10 identifies some of these initial conditions prior to printing and stores a recent history of the mirror motor ramp-up time as a function of the initial conditions. It is then possible to reduce the "time to first page" by more accurately predicting when the polygon mirror will rotate at the terminal speed. The concurrent processes, such as, for example, bias voltage stabilization, performing an erase cycle on a photoconductive drum, and performing a paper pick operation, can be started sooner while still being assured that the processes will not be completed before the polygon mirror reaches terminal speed. Printheads 12, 14, 16, 18 are structurally substantially identical. Accordingly, to simplify the discussion and for ease of understanding the invention, only the structure of printhead 12 will be described in detail below in relation to FIG. 3. However, it is to be understood that the discussion that follows with respect to printhead 12 also applies to each of printheads 14, 16 and 18.

Inside printhead 12 is a thermistor 76 (FIG. 3) whose resistance is proportional to the temperature of printhead 12. Also inside printhead 12 is an optical HSYNCn or start-of-scan sensor 78. Sensor 78 provides a pulse that is active once per facet 66 of mirror 46. For an eight-sided mirror 46, HSYNCn sensor 78 pulses eight times per revolution. HSYNCn sensor 78 pulses when the beam of a laser diode (not shown), caused by activation of the signal on the VIDEOn line, reflects off the surface of polygon mirror 46 and impinges upon HSYNCn sensor 78.

Control lines STARTn, LOCKn and REFCLKn interconnect controller 37 and printhead 12. REFCLKn carries a clock signal sent from controller 37 to printhead 12. The clock is typically active while power is applied to printer 10. Polygon mirror 46 rotates at a speed proportional to the clock signal. STARTn carries a signal that tells polygon mirror 46 to rotate or to stop. LOCKn carries a signal that is "high" when mirror 46 is not rotating near, i.e., within a predetermined range of, its terminal speed, and is "low" when mirror 46 is rotating near its terminal speed.

Controller 37 uses the information from thermistor 76 to determine if printhead 12 is hot or cold. Typically, printhead 12 accelerates faster if printhead 12 is warm. Controller 37 measures the output of thermistor 76 prior to activating mirror 46 in order to indicate the likely acceleration time and stabilization time of mirror 46. This information assists printer 10 in minimizing the time before imaging can begin.

In a first embodiment of a method of the present invention of activating a printhead, controller 37 activates REFCLKn so that printhead 12 knows the target rotational speed. Controller 37 then drops STARTn low. Next, controller 37 measures the time from STARTn going active to LOCKn going active. Once the LOCKn signal is active, controller 37 knows that printhead 12 will be stable within a time period specified by the manufacturer. This time period is typically on the order of 0.5 second. If the time from STARTn to LOCKn exceeds some predetermined time limit, printhead 12 issues an error.

As an example, for a printhead at rest to reach 20,000 rpm, the time period between STARTn going active and LOCKn going active may be 1.6 seconds at 25° C. With the tolerance of 0.5 second for printhead 12 to reach "true lock", the total time is 2.1 seconds for printhead 12 to reach a state when printing can begin. This time period of 2.1 seconds at 25° C. is stored in the nonvolatile random access memory (NVRAM) 80 and is used by controller 37 in subsequent activations of printhead 12.

The next time controller 37 decides to print, it can use the knowledge of the previous result to determine that printing can begin in 2.1 seconds plus some small safety factor, such as 0.5 second. This assumes that the printhead temperature is not less than some predetermined value. The temperature signal output by thermistor 76 at print time can be used to make adjustments in the time period allotted between STARTn and true lock. Typically, this time period will be longer for a cold printhead (less than 25° C.) and shorter for a warm printhead.

Controller 37 drops STARTn (REFCLK is already running) and measures the time to LOCKn going low. This new value is stored in NVRAM 80 and is used to calculate the total time to reach true lock for the next activation of printhead 12.

In a second embodiment of a method of the present invention of activating a printhead, controller 37 activates REFCLKn so that printhead 12 knows the target rotational speed. Controller 37 then drops STARTn low. Next, controller 37 continuously measures the time between HSYNCn falling edges. Once the LOCKn signal is active and the HSYNCn to HSYNCn time is within defined tolerances, controller 37 knows that printhead 12 is stable or truly locked. If the time from STARTn to truly locked exceeds some predetermined time limit, printhead 12 issues an error.

As an example, for a printhead at rest to reach 20,000 rpm, the time period between STARTn going active and LOCKn going active may be 1.6 seconds at 25° C. The time from HSYNCn to HSYNCn to fall within tolerances may be about 0.5 second. Thus, 2.1 seconds is the time from starting the motor until true lock occurs. This time period of 2.1 seconds at 25° C. is stored in the nonvolatile RAM (NVRAM) 80 and is used by controller 37 in subsequent activations of printhead 12.

The next time controller 37 decides to print, it can use the knowledge of the previous result to determine that printing can begin in 2.1 seconds plus some small safety factor, such as 0.5 second. This assumes that the printhead temperature is not less than some predetermined value. The temperature signal output by thermistor 76 at print time can be used to make adjustments in the time period allotted between STARTn and true lock. Typically, this time period will be longer for a cold printhead (less than 25° C.) and shorter for a warm printhead.

Controller 37 drops STARTn (REFCLK is already running). Next, controller 37 continuously measures the time between HSYNCn falling edges. Once the LOCKn signal is active and the HSYNCn to HSYNCn time is within defined tolerances, controller 37 knows that printhead 12 is stable or truly locked. This new value is stored in NVRAM 80 and is used to calculate the total time to reach true lock for the next activation of printhead 12.

As printhead 12 ages, the time to first print increases due to wear of the printhead bearings, etc. The method of the present invention allows controller 37 to adjust the allowed time between STARTn and true lock as printhead 12 ages. The benefit is that the user gets the shortest possible time to first page with assured reliability.

The method of the present invention has been described herein as using NVRAM to store data. However, it is to be understood that static RAM, dynamic RAM, or some other type of volatile RAM can also be used to store data.

Actual results will vary depending on motor type, manufacturer and age. Since less time is required for a motor to accelerate to a lower speed than to a higher speed, the benefit is greater for electrophotographic machines that use higher speed motors.

The present invention provides a shortest possible time to first print for a given printhead motor, rather than assuming worst-case operation for every motor. This can provide tangible benefits to customers by reducing time to first page and reducing wear on the printhead for users who typically print short jobs.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of activating an electrophotographic machine, comprising the steps of:
   determining at least one condition of the electrophotographic machine;
   applying power to a polygon mirror;
   measuring a time period required for said polygon mirror to accelerate from a stationary condition to a target rotational velocity;
   storing the measured time period and data associated with the at least one condition in a memory device;
   decelerating said polygon mirror back to the stationary condition;
   reapplying power to said polygon mirror at a point in time; and
   using the measured time period and the data to determine when to begin at least one process in the electrophotographic machine relative to the point in time.

2. The method of claim 1, comprising the further step of repeating said determining, measuring and storing steps each time said polygon mirror is accelerated to the target rotational velocity.

3. The method of claim 2, wherein said using step comprises using a latest measured time period and latest data to determine when to begin the at least one process in the electrophotographic machine relative to the point in time.

4. A method of activating an electrophotographic machine, comprising the steps of:
   applying power to a polygon mirror;
   measuring a time period required for said polygon mirror to accelerate from a stationary condition to a target rotational velocity;
   storing the measured time period in a memory device;
   decelerating said polygon mirror back to the stationary condition;
   reapplying power to said polygon mirror at a point in time; and
   using the measured time period to determine when to begin at least one process in the electrophotographic machine relative to the point in time.

5. The method of claim 4, comprising the further steps of:
   determining at least one condition of the electrophotographic machine, the at least one condition existing during said applying step;
   storing data associated with the at least one condition in said memory device; and
   using the data to determine when to begin the at least one process in the electrophotographic machine relative to the point in time.

6. The method of claim 4, wherein the at least one condition comprises at least one of a temperature, an age and a voltage.

7. The method of claim 6, wherein the temperature comprises a temperature of a printhead.

8. The method of claim 7, comprising the further steps of:
   providing a thermistor associated with said printhead; and
   using said thermistor to measure the temperature of said printhead.

9. The method of claim 6, wherein the age comprises an age of a printhead.

10. The method of claim 4, wherein the at least one process comprises at least one of voltage stabilization, an erase cycle on a photoconductive drum, and a paper pick operation.

11. The method of claim 4, comprising the further step of beginning the at least one process after the point in time.

12. The method of claim 4, comprising the further step of beginning the at least one process before said polygon mirror reaches the target velocity after said reapplying step.

13. The method of claim 4, comprising the further step of repeating said measuring and storing steps each time said polygon mirror is accelerated to the target rotational velocity.

14. The method of claim 13, wherein said using step comprises using a latest measured time period to determine when to begin the at least one process in the electrophotographic machine relative to the point in time.

15. The method of claim 4, wherein said polygon mirror is disposed within a printhead.

16. The method of claim 15, comprising the further step of sending a clock signal from a controller to said printhead, said clock signal specifying the target rotational velocity.

17. The method of claim 16, comprising the further step of sending a start signal from said controller to said printhead, said start signal indicating whether the polygon mirror should be rotating.

18. The method of claim 17, comprising the further step of sending a lock signal from said printhead to said controller, said lock signal indicating whether a velocity of said polygon mirror is within a predetermined range of the target rotational velocity.

19. The method of claim 18, wherein said measuring step includes determining a time period between the start signal and the lock signal.

20. The method of claim 15, wherein said printhead includes a start-of-scan sensor, said start-of-scan sensor providing a pulse signal indicative of a current rotational velocity of said polygon mirror.

21. The method of claim 20, wherein said measuring step is performed by a controller receiving the pulse signal.

22. The method of claim 4, wherein said memory device comprises a nonvolatile random access memory.

\* \* \* \* \*